Aug. 29, 1961 R. E. BECKER 2,998,026
DIFFERENTIAL PRESSURE AIR VALVE
Filed Nov. 27, 1957
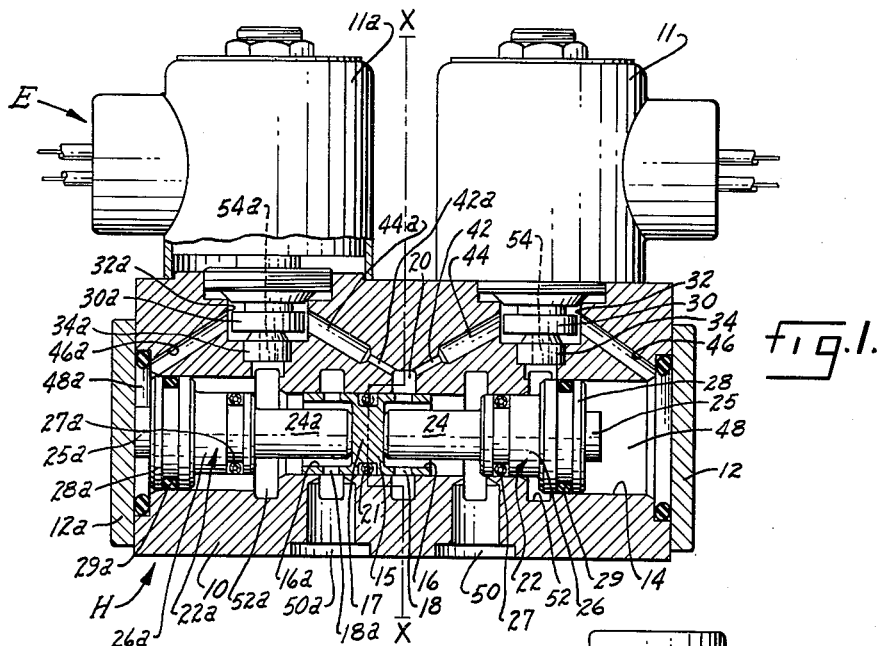
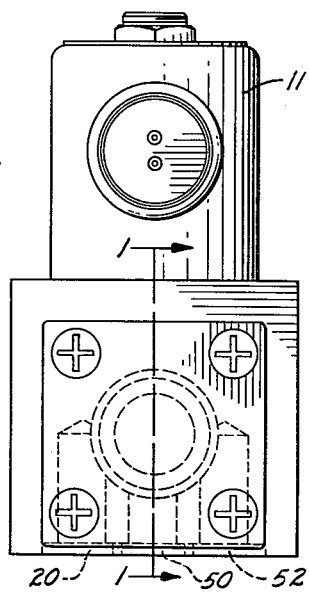
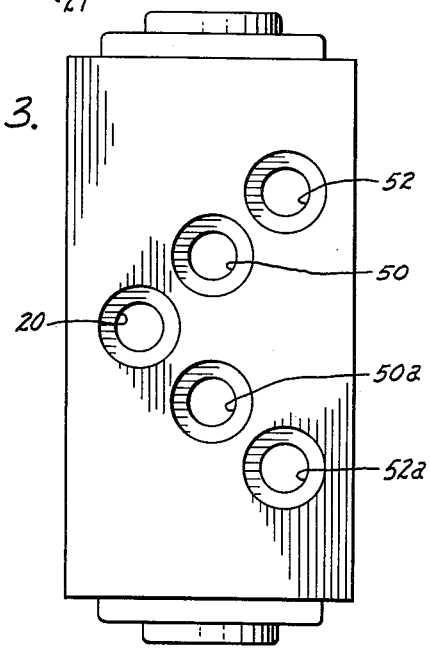
INVENTOR.
ROBERT E. BECKER,
BY
Parker and Carter
ATTORNEYS.

United States Patent Office 2,998,026
Patented Aug. 29, 1961

2,998,026
DIFFERENTIAL PRESSURE AIR VALVE
Robert E. Becker, Logansport, Ind., assignor to Logansport Machine Company, Logansport, Ind., a corporation of Indiana
Filed Nov. 27, 1957, Ser. No. 699,378
8 Claims. (Cl. 137—622)

My invention resides in the field of air pressure devices and specifically to pneumatic valves suitable for use in selectively admitting pressure to actuate power cylinders.

Accordingly, an important object is the provision of a four-way air control valve suitable for use in regulating the working fluid to the ends of working cylinders or the like.

Another object is the provision of a four-way air control valve capable of admitting fluid pressure to a cylinder in a working cycle of varying lengths.

A further object is the provision of a four-way air control valve which includes a pair of electro-magnetic devices capable of operation in response to a predetermined control cycle.

Another object is the provision of a novel arrangement of exhaust ports and fluid pressure passageways for creating pressure differentials in a four-way air control valve in order to induce actuation of the moving element of the valve.

Another object is to provide a four way air control valve which utilizes pressure within the valve for actuating the valve spool to thereby eliminate springs or outside spool holding forces.

Another object is to provide a four way air control valve which has no moving parts connected to the valve spool projecting from the valve housing to thereby eliminate machining operations during construction and avoid the necessity of external seals with their consequent danger of leakage.

Other objects will become apparent throughout the course of the following specification.

I illustrate my invention more or less diagrammatically in the accompanying drawings in which, FIGURE 1 is a partial sectional view of my four-way air control valve with the main housing shown in section taken along the line 1—1 of FIGURE 2;

FIGURE 2 is an end view taken from the right end of FIGURE 1; and

FIGURE 3 is a bottom view showing the inlet, cylinder, and exhaust ports.

Like reference numerals will be used to indicate like parts throughout the several views.

Referring now specifically to FIGURE 1, my four-way air control valve is shown as composed generally of a main housing H and a pair of electro-magnetic valves 11 and 11a adapated for connection through leads to any suitable timing device. It will be understood that my valve is symmetrical with respect to the line X—X shown in FIGURE 1. Accordingly, throughout the specification corresponding parts to the left of the line X—X will be designated with the same reference numerals used on the right-hand side plus the sub-character "a."

The housing is composed essentially of a valve body 10 and end covers 12 and 12a. The valve body and end covers form an elongated chamber 14 of varying diameters throughout its length. Disposed within the elongated chamber 14 is a valve member 15 which in effect is an inner piston having hollow ends 16 and 16a separated by a partition wall 17. Diammetrically disposed about the circumference of the hollow ends of the inner piston are a series of holes 18 and 18a opening into the hollow ends. A high pressure inlet port is indicated at 20 and a suitable O-ring or other sealing member 21 is provided to seal the fluid pressure on either side of the inlet port 20, depending upon the position of valve member 15.

Abutting the partition wall 17 are two outer piston members 22 and 22a. These piston members include stems 24 and 24a and intermediate shoulder portions 26 and 26a, with an O-ring or similar sealing member 27 and 27a adapted for close fitting engagement with the circular surface of the elongated chamber. The extremities of the outer piston members include end portions 28 and 28a having similar sealing members 29 and 29a. I have shown projections at 25 and 25a that extend from the extremities of the outer piston members and impinge upon the end covers in order to maintain at least a minimum chamber clearance and provide a working space for the pressure fluid.

On top of the main housing are a pair of electromagnetic valves. Preferably I use solenoid valves indicated at E having suitable leads for connection to any timing device integrated into the system in which the valve is used. The solenoids have actuating plungers 30 and 30a loosely fitting in bores 32 and 32a in the top of the housing. The plungers rest on seats 34 and 34a when in their lowermost position, as shown in FIGURE 1.

The fluid pressure path is as follows. Communicating with the pressure inlet port 20 are a pair of main passages 44 and 44a opening into the bores 32 and 32a and connected with the inlet port by constricted portions or orifices 42 and 42a. Leading outwardly from the bores 32 and 32a are passages 46 and 46a opening into chambers 48 and 48a. Chambers 48 and 48a vary in volume depending upon the position of the inner and outer piston members which move as a unit. A pair of cylinder ports are indicated at 50 and 50a and a pair of exhaust ports at 52 and 52a.

Above the elongated chamber are a pair of passages 54 and 54a whose lower ends open into the exhaust ports 52 and 52a, and whose upper end open into chambers 32 and 32a when the plungers 30 and 30a have been lifted from their seats.

It will be understood that various modifications may be made. For example, I have shown the moving parts of my valve as consisting of the inner piston 15 and outer pistons 22 and 22a. Actually, it would be entirely possible from a theoretical standpoint to make them of unitary construction. Manufacturing and assembly considerations dictate that they be separate parts even though they move as a unit. Similarly, it might be possible to arrange the exhaust and cylinder ports entirely on one side of the pressure inlet port, but I have found that the symmetrical arrangement is very satisfactory from a cost and design viewpoint.

The use and operation of my device is as follows:

My electro-magnetic four-way air control valve is particularly suitable for attachment to a working cylinder which may be used to control movements of machine tools for example. In the following description it will be assumed that the parts are in their relative positions of FIGURE 1 with cylinder ports 50 and 50a connected to the ends of a working cylinder.

In commencing operation, fluid under pressure enters the valve through inlet port 20 and from there passes through orifices 42 and 42a, through passages 44 and 44a and into chambers or bores 32 and 32a. The plungers 30 and 30a are seated on 34 and 34a and no fluid flows into passages 54 and 54a.

From the bores the fluid passes through the passages 46 and 46a into the pressure chambers 48 and 48a of the valve, and since the area exposed to the fluid pressure is approximately the same at each end of the chamber there will be no movement of inner piston 15. In the position shown, the pressure fluid will also pass through the diametrical holes 18 into the hollow end 16 of the inner piston, around the piston stem 24 and out the cylinder port 50 which as stated above is connected to a working cylinder for actuation of a moving part of a machine tool for example.

As the piston in the working cylinder moves in response to the fluid pressure being admitted through port 50, the fluid on the opposite side of the working cylinder piston will exhaust through a connection into port 50a, through the holes 18a, around the stem of the outer piston 24a and into exhaust port 52a to the atmosphere.

In the second stage of operation the right solenoid 11 is energized and the plunger 30 is lifted from its seat 34, thus opening passage 54 and permitting the fluid pressure to escape from the chamber 48 via 46, 32 and 54 into the exhaust port 52 to the atmosphere. This fluid movement creates a momentary pressure drop in chamber 48 of sufficient duration to allow the maintained pressure in chamber 48a to force outer piston 24a to the right, thus moving inner piston 15 and outer piston 24 to a like position at the right-hand side of the valve body. That is, the parts will occupy a position exactly reversed to that shown with the O-ring 21 disposed on the right-hand side of the pressure inlet source 20.

It will be observed that when plunger 30 is lifted from its seat 34, the entire system including the pressure source will be momentarily opened to the atmosphere. However, due to the constrictions 42 and 42a, which are of a much smaller diameter than the passage 46, a greater quantity of air will be vented from chamber 48 than from the inlet, thus producing the momentary difference in pressure.

De-energizing solenoid 11 permits the plunger 30 to descend onto its seat 34 thus closing the orifice 54 and allowing fluid pressure to build up in chamber 48 to equal that in chamber 48a. As both piston areas are substantially the same, the piston assembly will remain in position until solenoid 11a is energized to reverse the cycle. That is, when the inner piston 15 has been moved to the right, fluid pressure will flow from pressure inlet 20 through the holes 18a and around stem 24a out through working cylinder port 50a, while the other end of the working cylinder vents through cylinder port 50 around the valve stem and out through the exhaust port 52. Pressure will also build up in chambers 48 and 48a as before.

It will be understood that many variations may be made in the size, shape and disposition of parts without departing from the essential spirit of my invention. Accordingly, the above description is intended to be illustrative only, and I do not wish to be limited except by the scope of the following appended claims.

I claim:

1. The method of actuating a control spool in a conventional four way air control valve consisting of the steps of creating substantially equal opposing pressure forces on each side of a control spool within a valve housing, momentarily decreasing the force on one side of the spool by connecting said one side to exhaust while maintaining each side of the spool in communication with a pressure source to thereby move the spool, blocking off direct communication between said one side of the spool and exhaust, and recreating substantially equal opposing pressure forces on each side of the spool at the conclusion of the induced value spool movement.

2. A fluid control valve including a housing forming a closed chamber, a source of fluid pressure adapted for communication with the chamber, at least two exhaust ports in the housing communicating with the chamber and means for selectively blocking communication between the exhaust ports and the chamber, at least two working ports in the housing communicating with the chamber, displaceable means within the chamber having a portion adapted for close fitting engagement with the chamber and disposed between the working and exhaust ports, said displaceable means blocking fluid communication between the ends of the chamber in all operative positions, means for equalizing the pressure on each side of the close fitting portion of the displaceable means, and means for selectively creating unequal pressures on opposite sides of the close fitting portion of the displaceable means in order to actuate the displaceable means.

3. The structure of claim 2 further characterized in that the means for selectively creating unequal pressures on opposite sides of the displaceable means includes constrictions in the fluid passageway between the fluid pressure source and the ends of the chamber whereby actuation of an exhaust port blocking means to vent one end of the chamber to atmosphere induces a pressure drop in said one end of the chamber.

4. The structure of claim 3 further characterized in that the constrictions are located between the pressure source and the blocking means.

5. The structure of claim 4 further characterized in that the exhaust port blocking means are valve members, and further including means for selectively seating and unseating the valve members to thereby selectively vent the ends of the chamber.

6. An air control valve including a housing forming a chamber, passageways for connecting the chamber to a source of air under pressure, a pair of working cylinder ports and a pair of exhaust ports opening into the chamber, a displaceable piston assembly in the chamber disposed between each of the pairs of ports, said piston assembly being movably positioned to open one working cylinder port to the source of air under pressure and to block communication between the other working port and the source of air under pressure, and vice versa, said piston assembly dividing the chamber in all operative positions, valve members blocking communication between the ends of the chamber and the exhaust ports, said valve members, when unseated, opening communication between the ends of the chamber and the exhaust ports to exhaust the ends of the chamber, and means for momentarily creating a lower pressure on one side of the piston assembly than the other to thereby move the piston.

7. The air control valve of claim 6 further characterized in that the means for momentarily creating a lower pressure on one side of the piston assembly includes a constriction in each passageway between the source of air under pressure and the ends of the chamber whereby the pressure in one end of the chamber drops faster than in the other end when said one end is vented to exhaust by the valve member.

8. The air control valve of claim 7 further characterized in that the exhaust ports open into the passageways connecting the chamber to the source of air when the valve members are unseated and the constrictions are located in the passageways between the source of air under pressure and the junctions of the exhaust ports and the passageways.

References Cited in the file of this patent

UNITED STATES PATENTS

| 569,366 | Wilkin | Oct. 13, 1896 |
| 2,396,787 | Hawthorne | Mar. 19, 1946 |
| 2,409,517 | Schmit | Oct. 15, 1946 |
| 2,739,613 | Kulikoff | Mar. 27, 1956 |
| 2,778,378 | Presnell | Jan. 22, 1957 |
| 2,823,689 | Healy | Feb. 18, 1958 |
| 2,836,154 | Lantz | May 27, 1958 |
| 2,836,196 | Gunn | May 27, 1958 |

FOREIGN PATENTS

| 1,050,510 | France | Sept. 2, 1953 |